Dec. 9, 1930.  C. E. SUMMERS  1,784,767
HYDRAULIC VALVE MECHANISM
Filed Aug. 24, 1928  3 Sheets-Sheet 2

Inventor
Caleb E. Summers
By Blackmore, Spencer & Fish
Attorney

Dec. 9, 1930.  C. E. SUMMERS  1,784,767
HYDRAULIC VALVE MECHANISM
Filed Aug. 24, 1928  3 Sheets-Sheet 3
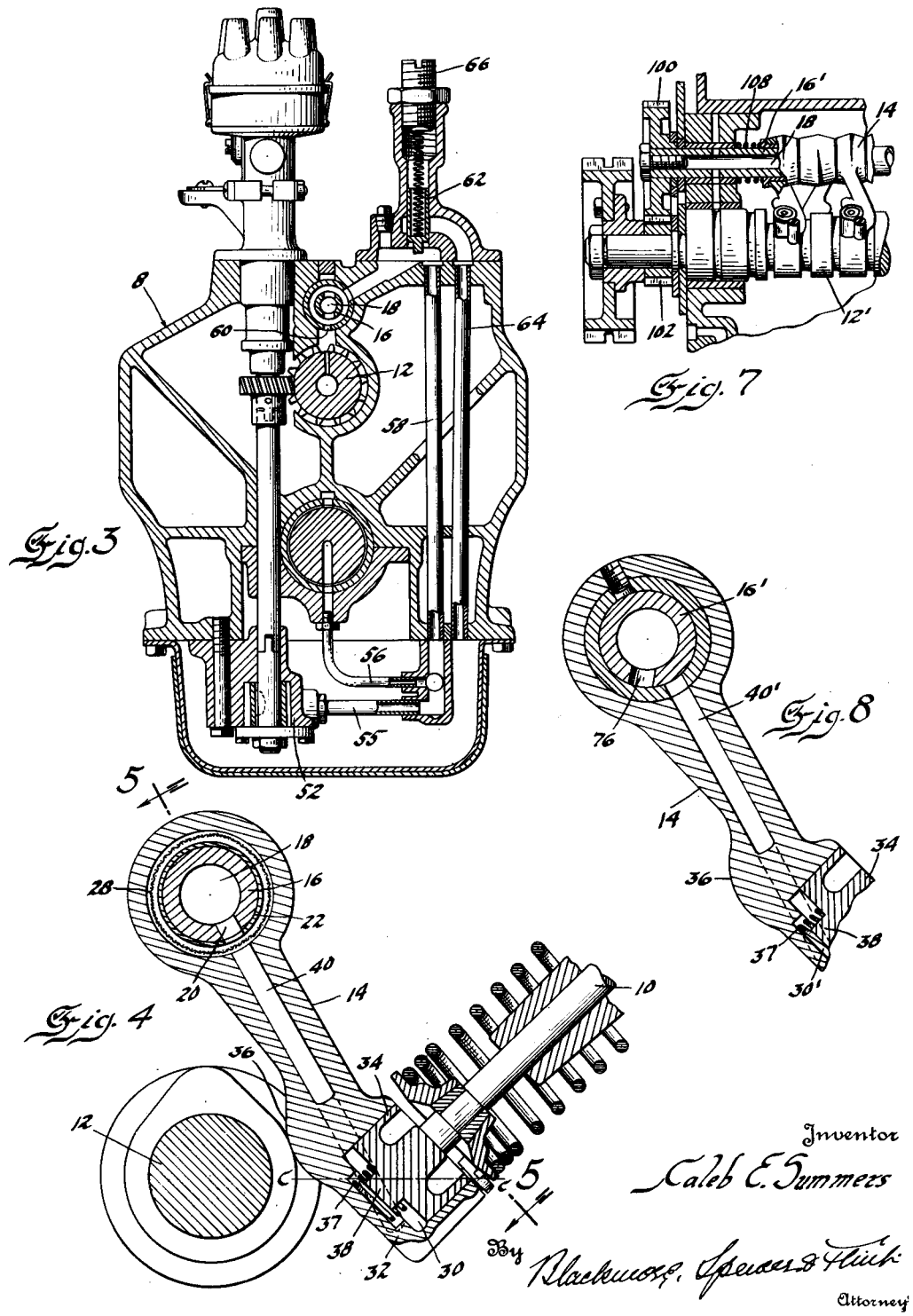

Patented Dec. 9, 1930

1,784,767

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

HYDRAULIC VALVE MECHANISM

Application filed August 24, 1928. Serial No. 301,764.

This invention relates to hydraulic mechanism for transmitting motion and is shown applied in valve operating mechanism for internal combustion engines.

It is well-known that mechanical valve operating gear must be adjusted so that there is clearance between the parts when cold to provide for expansion as the engine warms up. If this lash or clearance were not provided the expansion of the parts would cause the valves to be permanently held off their seats and interfere with the operation of the engine. However, the provision of clearance renders the valve gear noisy upon starting and unless the adjustment is an extremely accurate one the gear will be more or less noisy in all stages of operation of the engine.

Many attempts have heretofore been made to employ hydraulic mechanism for operating the valves for with such mechanism it is theoretically possible to take up all lash or clearance in the system, both when the engine is cold and when it is hot and thus obtain noiseless performance at all times. However, so far these systems have found little, if any, application because of various inherent defects. Among these may be mentioned complication; inability to start after standing owing to the accumulation of air in the hydraulic chamber; and increase in weight of the valve operating mechanism necessitating the use of stronger valve springs—the last named a fault which is open alone sufficient to render a design unfitted for employment in modern high speed engines.

I have devised an improved hydraulic valve gear that overcomes to a large degree the defects of prior structures. In it are incorporated many novel features. It is of the type in which the hydraulic chamber moves up and down with the valve, in contrast to the type in which the fluid oscillates back and forth in a fixed chamber. The chamber is embodied in a rocker which is interposed between the cam shaft, or other actuating part, and the valve or valve tappet. Provision is made for replenishing the fluid in the chamber from time to time by supplying oil through the pivot for the rockers. I may provide a check valve or a positively operated valve for shutting off the oil supply line during the operating portions of the valve cycle. The check valve is preferably located in the passages in the rocker member leading to the hydraulic chamber. If positive actuation is preferred I may accomplish this in a simple manner by driving the shaft on which the rockers are pivoted and using it as a rotary valve to control the feeding of oil to the rockers. The hydraulic chamber may be formed in the portion of the rocker which engages the valve stem or tappet or in the portion which engages the cam shaft. I have preferred to form it in the valve stem engaging portion. The hydraulic chamber is provided with a movable wall in the form of a diaphragm or plunger for engaging the valve stem. I prefer to employ a plunger, as this permits the escape of entrapped air between the plunger and its guide. Any suitable resilient means such as a coil spring may be employed to urge the piston into contact with the valve stem. The purpose of the spring is not in itself to take up slack but merely to tend to urge the piston upwardly during the non-operating parts of the cycle so as to draw into the chamber the amount of oil necessary to form, in effect, a fixed abutment for the piston, the oil holding the piston in a position of adjustment in which oil clearance is taken up. Obviously the intermittent connection with the oil supply will insure that the body of fluid is maintained at the proper volume for this purpose.

In prior devices of this character a great deal of difficulty has been experienced in the accumulation of air in the hydraulic chamber, this air merely contracting and expanding as a result of the operation of the cam shaft and producing no motion of the valve. I have overcome this difficulty by arranging my connection with the oil supply at the highest point in the fluid chamber formed in the pivoted members so that the air will work toward the top and escape through the interior of the hollow shaft. I have also minimized the effect of the presence of air by employing a very small quantity of oil in the hydraulic chamber, this quantity being so slight that the small percentage of air finding access to the system when the engine is idle will not be sufficient to appreciably interfere with valve operation. Such air as does find its way into the hydraulic chamber will eventually escape through the clearance provided between the piston and its guide.

My design is also such that operation of the gear will not entirely fail should it be entirely empty of oil. I have accomplished this by providing for a relatively small amount of clearance between the plunger and the bottom of the chamber in which it works so that should the chamber be entirely devoid of oil the valve gear will nevertheless operate, although noisily, by contact of the plunger with the bottom of the cylinder. The noise will serve as a signal to the operator that the valve gear and the lubricating system is not functioning properly.

In the drawing:

Figure 3 is a section on line 3—3 of Figure 1.

Figure 4 is a fragmentary sectional view of the valve actuating gear, the hydraulic mechanism being sectioned on line 4—4 of Figure 5.

Figure 7 is a section corresponding to a portion of Fig. 1 but showing a slightly modified form of the invention.

Figure 8 is a fragmentary sectional view of one of the rockers of Figure 7.

Figure 1:
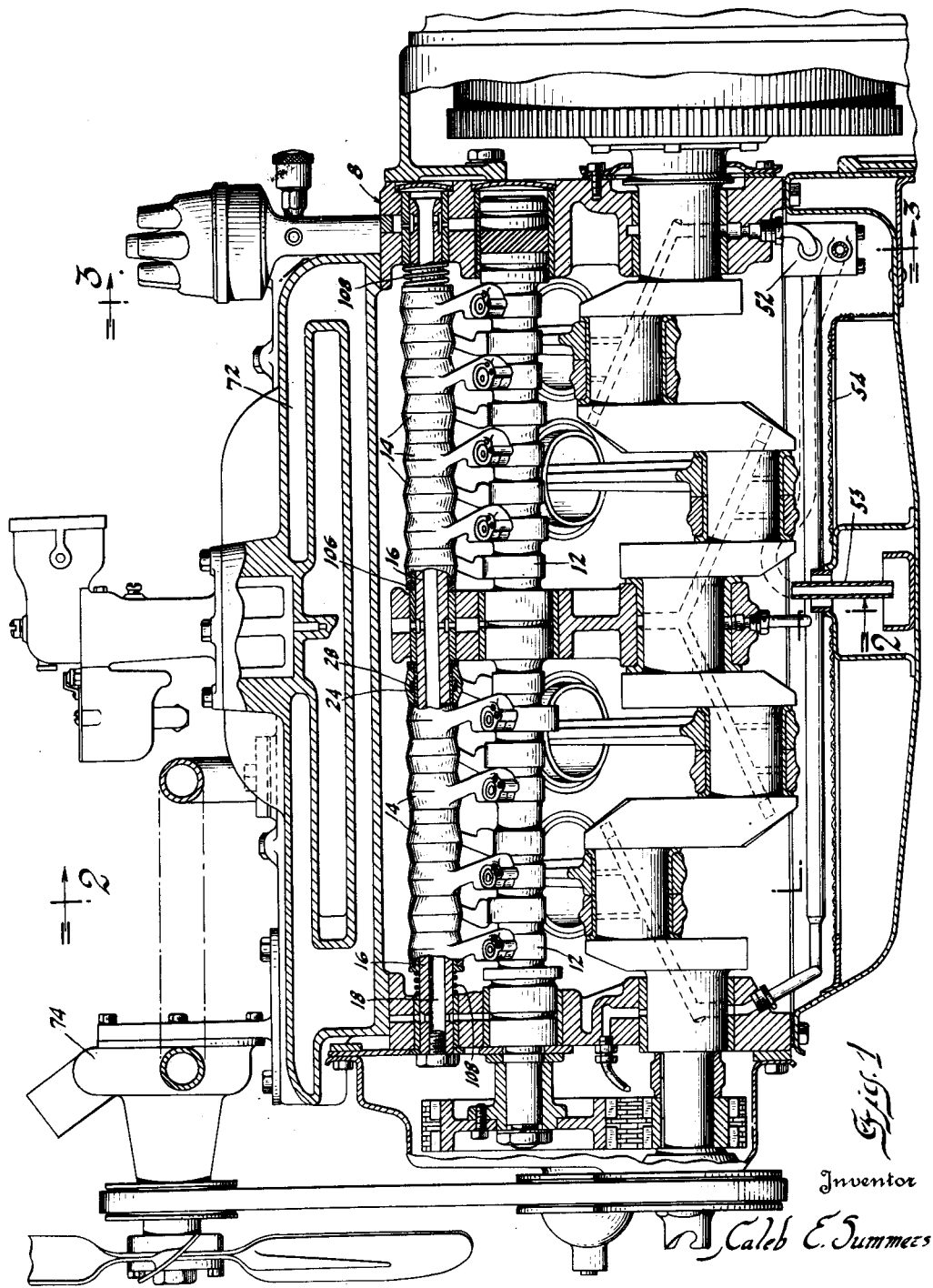
Figure 1 is a longitudinal sectional view through a V-type engine showing portions of my improved valve actuating gear in elevation.
Figure 2:
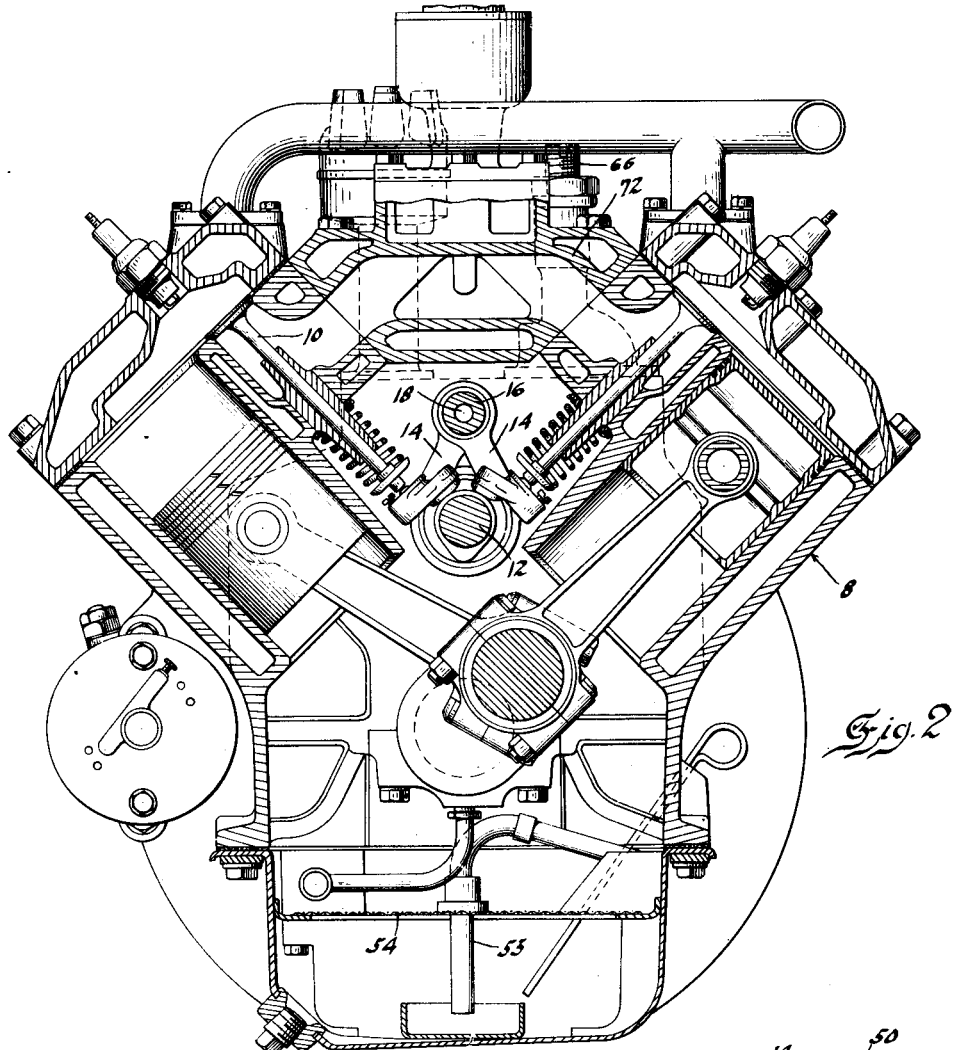
Figure 2 is a section on line 2—2 of Figure 1.

My improved hydraulic operating mechanism is especially designed for embodiment in valve operating gear in which a rocker member is interposed between an actuating part and an actuated part. In its broadest aspect the mechanism is capable of application in engines having either side valves or overhead valves. However, I have chosen to embody the invention in an engine 8 of the V-type in which the valves 10 are operated from a common cam shaft 12 through the intermediary of rockers 14 pivoted on a common shaft 16. Since a V-type engine is nothing but two multiple cylinder engines arranged with their cylinders at an angle and driving a common shaft it is obvious that the drawing also illustrates the application of the invention to an ordinary engine in which all of the cylinders are in line. The shaft 16 is bored out as at 18 to constitute a lubricant distributing channel from which oil is supplied to the rocker arm bushings 22 through radial bores 20, Figure 5.

In the form of the invention shown in Figures 1 to 5 the bushings 22 are provided with an exterior annular channel 24 communicating with the bore 20 by means of bores 26 aligning therewith. Within each of the bores 24 I have provided an annular screen 28 securely soldered in place and serving to prevent the entrance of dirt into the hydraulic chamber. The hydraulic chamber 30 is formed in an offset 32 at the end of the rocker 14 and consists of a cylinder or guide in which reciprocates the piston 34 engaging the end of the valve stem. At an intermediate point the rocker is provided with a formed surface 36 for engaging the cam shaft, the surface being so shaped as to give the effect of a roller. It may be pointed out that in some installations it might be found desirable to design the gear so that the piston 34 engages the cam shaft instead of the valve stem but I prefer the arrangement shown. It may also be mentioned that instead of directly engaging the valve stem the piston 34 may engage the valve tappet, such as is employed in conventional L-head or overhead valve engines.

Figure 5:
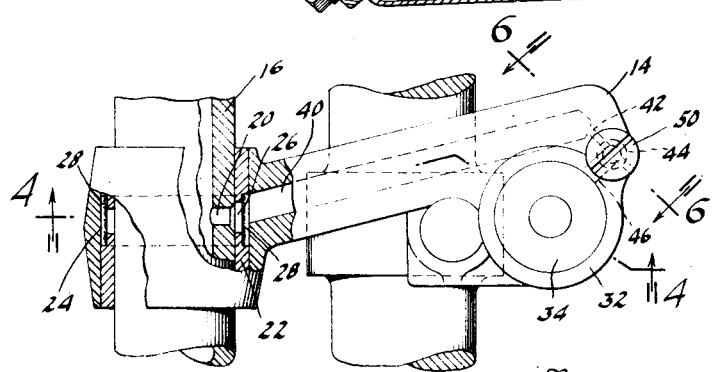
Figure 5 is a view on line 5—5 of Figure 4.
Figure 6:
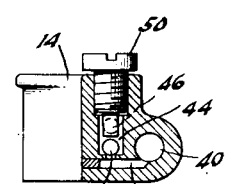
Figure 6 is a section on line 6—6 of Figure 5.

The plunger 34 is normally urged upwardly by a light spring 37 encircling boss 38 formed on the bottom of the plunger and is normally held out of contact with the bottom of the hydraulic chamber 30 by means of an interposed body of oil. This oil is supplied to the chamber from the interior of shaft 16 through the radial bores 20, bore 26 and annular channel 24, previously described, and thence through bore 40 extending substantially the entire length of the rocker, passage 42, valve chamber 44 and passage 46, as is best shown in Figures 5 and 6. Within the valve chamber 44 is located ball valve 48 normally resting on its seat as shown and limited in its movement away from the seat by the reduced end of stud 50. The valve 48 functions simply as a one-way check valve permitting entrance of oil into the hydraulic chamber but preventing its escape therefrom. This valve is made use of where the shaft 16 is stationary, as illustrated in Figure 1.

In Figure 3 I have shown the preferred method of supplying the interior of the shaft 16 with oil from the lubricating system. Here 52 indicates the usual oil pump obtaining its supply of oil from the crank case through intake 53, extending below the oil filtering screen 54. From the pressure side of the pump oil is lead by conduit 55 and branch conduit 56 to the crankshaft bearings and through branch 58 to the interior of the hollow pivot shaft 16. In addition to the bores leading to the hydraulic chambers the shaft 16 is provided with bores 60 registering with suitable passages leading to the cam shaft bearings. Conduit 58 is equipped with a pressure relief valve 62 which in case of excessive pressure discharges excess oil through conduit 64 into the crankcase. Provision is made at 66 for adjustment of the pressure to which the valve 62 is subjected.

In the operation of this form of my invention it is apparent that the hydraulic chambers 30 will normally contain a sufficient amount of oil to take up most of the lash in the operating gear. As clearly shown in Fig. 4 the hydraulic chamber and the passage 40 will always remain filled to the level indicated by the line c—c even though the rest of the oil should leak out between the plunger 34 and its cylinder 32. However, should these chambers, through any unusual circumstance, be entirely empty the valve gear will still operate for the lug 38 on the bottom of the piston 34 will contact with the bottom of the chamber 30 permitting operation of the engine although with considerable noise. With the engine in operation oil will be forced by pump 52 to the bearings in the usual manner and through passages 55 and 58 to the interior of the pivot shaft 16 from whence it will pass, in the manner previously described, to the hydraulic chamber 30. The passage of oil into the chamber is facilitated by the pumping action produced by the spring 37. This spring is so light in comparison with the valve spring that its effect on the latter during the operating stroke is negligible. However, during the non-operating parts of the valve cycle the spring 37 expands so as to cause the piston 34 to contact with the valve stem and produces a slight degree of suction in the chamber 30 which assists in drawing oil past the check valve 48. When the chamber 30 is filled with oil all clearance between the valve operating parts is taken up. This clearance, as previously explained, becomes less as the parts of the valve gear become heated and expand and in such event the excess oil is forced out between the plunger and its guide. Should the engine speed be reduced and the parts become cool and contract the spring 37 will again cooperate with the pressure in the oil supply line to introduce more oil into the chamber 30 and take up the increased clearance. The valve gear is thus self adjusting and will operate noiselessly under all conditions.

In Figure 7 I have shown a modified form in which the pivot shaft 16' is driven by means of gears 100 and 102 from the camshaft 12' and at one-half cam shaft speed. In this case the shaft 16' is provided with ports 76 adapted to intermittently register with the channels 40' leading to the hydraulic chambers 30'. In this form of the invention the check valves 48 are dispensed with since the rotating shaft is an effective rotary valve shutting off communication between the hydraulic chamber and the oil supply during the non-operating parts of the valve cycle.

Attention is called to the fact that in both forms of my invention I may employ packing 106 at the ends of a series of rocker members and at one end may employ a light coil spring 108 to yieldingly hold the rockers together preventing the escape of oil from between them.

I claim:

1. The combination of a pivoted actuating member, an actuated member, and an hydraulic slack adjuster carried by the pivoted member and adapted to engage one of said members for taking up slack in the system, means for supplying the slack adjusting device with oil through the pivot of said actuating member and a cut off valve in said pivot for cutting off communication with the reservoir during the actuating stroke of the mechanism.

2. The combination of a pivoted actuating member, an actuated member, and an hydraulic slack adjusting device carried by the pivoted member and adapted to engage the actuated member for taking up slack in the system, means for supplying oil to the slack adjusting device through the pivot of the actuating member, and a rotary cut off valve embodied in said pivot for cutting off communication with the oil supply throughout the operating parts of the cycle.

3. Hydraulic valve operating mechanism comprising a cam shaft, a valve, a pivoted member interposed between the cam shaft and the valve, and an hydraulic slack adjusting device carried by the pivoted member and adapted to take up slack in the mechanism, means for supplying fluid to said devices and a mechanically operated cut off valve for closing communication with said oil supply during the operating parts of the cycle.

4. In valve gear for internal combustion engines, the combination of a rocker member formed with a guide therein, a plunger slidable in the guide and forming therewith an hydraulic chamber, a part in working contact with the plunger, said rocker being provided with a longitudinal bore for supplying fluid to the chamber to take up slack in the system, and a valve for cutting off connection with the oil supply during the operating parts of the cycle.

5. In valve gear for internal combustion engines, the combination of a rocker member formed with a guide therein, a plunger slidable in the guide and forming therewith an hydraulic chamber, a part in working contact with the plunger, said rocker being provided with a longitudinal bore for supplying fluid to the chamber to take up slack in the system, and a valve for cutting off connection with the oil supply during the operating parts of the cycle, the pivot of said rocker member being provided with a passage adapted to register with said bore for supplying oil thereto.

6. In valve gear for internal combustion engines, the combination of a rocker member formed with a guide therein, a plunger slidable in the guide and forming therewith an hydraulic chamber, a part in working contact with the plunger, said rocker being provided with a longitudinal bore for supplying fluid to the chamber to take up slack in the system, and a valve for cutting off connection with the oil supply during the operating parts of the cycle, and a spring for normally urging the plunger outwardly of the cylinder.

7. In valve operating gear for internal combustion engines, the combination of a pivoted rocker member provided with an hydraulic chamber having a movable wall and normally separated from the bottom of the chamber by an interposed body of fluid, a valve for preventing escape of fluid during the operating part of the cycle and means normally urging the wall outwardly of the chamber.

8. In valve operating gear for internal combustion engines, the combination of a pivoted rocker member provided with an hydraulic chamber having a movable wall and normally separated from the bottom of the chamber by an interposed body of fluid, and means normally urging the wall outwardly of the chamber, means for supplying the chamber with fluid to replenish the supply.

9. An internal combustion engine comprising a reciprocating valve member, a rocker for actuating the valve member, a pivot for the rocker, and a cam for operating the rocker, said pivot being hollow, means for supplying lubricant to said pivot, said rocker being formed to provide an hydraulic chamber at one of its contact portions and with a passage leading from the pivot to the chamber, said pivot being apertured for supplying oil to the passage, a movable wall for said hydraulic chamber constituting one of the points of contact of said rocker, said pivot being located above the chamber so as to permit air to escape therethrough.

10. An internal combustion engine comprising a reciprocating valve member, a rocker for actuating the valve member, a pivot for the rocker, a cam for operating the rocker, said pivot being hollow, means for supplying lubricant to said pivot, said rocker being formed to provide an hydraulic chamber at one of its contact portions and with a passage leading from the pivot to the chamber, said pivot being apertured for supplying oil to the passage, a non-return valve in said passage, a piston for said hydraulic chamber constituting one of the points of contact of said rocker, said pivot being located above the chamber so as to permit air to escape therethrough.

11. An internal combustion engine comprising a reciprocating valve member, a rocker for actuating the valve member, a pivot for the rocker, a cam for operating the rocker, said pivot being hollow, means for supplying lubricant to said pivot, said rocker being formed to provide an upwardly facing hydraulic chamber, a passage leading from the pivot to the chamber and communicating with the latter at its lowermost portion, said pivot being apertured for supplying oil to the passage, a non-return valve in said passage adjacent its point of communication with said chamber, a piston for said hydraulic chamber constituting one of the points of contact of said rocker, said pivot being located above the chamber so as to permit air to escape therethrough.

12. An internal combustion engine provided with angularly extending valve members, a hollow rocker shaft, angularly extending rockers mounted on said shaft, means for actuating the rockers for operating said valve members, means for supplying lubricant to said hollow rocker shaft, said rockers each being formed to provide a hydraulic chamber at one of its contact portions and with a passage leading from the rocker shaft to the chamber, said shaft being apertured for supplying oil to said passages, a movable wall for each of said chambers constituting one of the points of contact of said rockers, said rocker shaft being located above said chambers so as to permit air to escape therethrough.

13. An internal combustion engine provided with valve members extending in upwardly diverging relation, a hollow rocker shaft, rockers on said shaft, a cam shaft for actuating the rockers, means for supplying lubricant to said hollow rocker shaft, each of said rockers being formed to provide an hydraulic chamber at one of its contact portions and with a passage leading from the pivot to the chamber, said rocker shaft being apertured to supply oil to said passages, non-return valves in said passages, a piston in each of said hydraulic chambers constituting one of the points of contact of said rockers, said hollow rocker shaft being located above said chambers so as to permit air to escape therethrough.

14. An internal combustion engine provided with valve members extending in upwardly diverging relation, a hollow rocker shaft, rockers on said shaft, a cam shaft for actuating the rockers, means for supplying lubricant to said hollow rocker shaft, each of said rockers being formed to provide an upwardly facing hydraulic chamber and with a passage leading from the rocker shaft to the chamber and communcating with the latter at its lowermost portion, said rocker shaft being apertured to supply oil to said passages, a non-return valve in said passage adjacent its point of communication with said chamber, a piston in each of said hydraulic chambers engaging the corresponding valve member, said rocker shaft being located above said chambers so as to permit air to escape therethrough.

15. The combination of an operating part, an operated part, a pivoted member arranged to transmit motion between said parts, and formed to provide an hydraulic chamber having a movable wall adapted to engage one of said parts, means for supplying said chamber with fluid and a non-return valve for said chamber adapted to confine the fluid therein so that movement is transmitted from one part to the other through the body of fluid.

16. The combination of a reciprocating valve member, a hollow rocker shaft, a rocker pivoted on the shaft and adapted to actuate the valve member, means for supplying oil to the shaft, a cam shaft for operating the rocker, said rocker being formed to provide a hydraulic chamber having a piston therein adapted to engage one of said parts and a passage leading from the shaft to the chamber, a non-return valve in said passage adapted to confine fluid therein so that motion is transmitted from the cam shaft to the valve member through the body of oil in the chamber.

17. The combination of an operating part, an operated part, a pivoted member arranged to transmit motion between said parts and formed to provide an upwardly facing hydraulic chamber, a piston working in the chamber and adapted to engage the uppermost part, means yieldingly urging the piston out of the chamber to take up slack in the system, means for supplying said chamber with fluid, and a non-return valve for said chamber adapted to confine the fluid therein so that movement is transmitted from one part to the other through the body of fluid.

18. The combination of a reciprocating valve member, a hollow rocker shaft, means for supplying lubricant to the shaft, a rocker pivoted on the shaft and adapted to actuate the valve member, a cam shaft for operating the rocker, said rocker being formed to provide an upwardly facing hydraulic chamber having a piston therein adapted to engage said valve member, said rocker also being provided with a passage leading from the shaft to the chamber for conveying fluid thereto, and a non-return valve in said passage adapted to confine fluid therein so that motion is transmitted from the cam shaft to the valve member through the body of oil in the chamber.

In testimony whereof I affix my signature.

CALEB E. SUMMERS.